July 31, 1962 R. L. COX 3,047,275
MIXING OF GRANULAR AND/OR POWDERY SOLID MATERIALS
Filed April 27, 1960 2 Sheets-Sheet 1
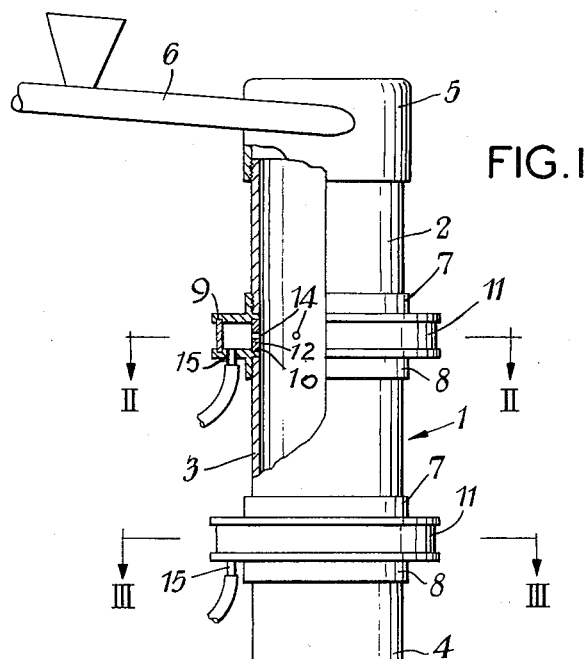
FIG.1
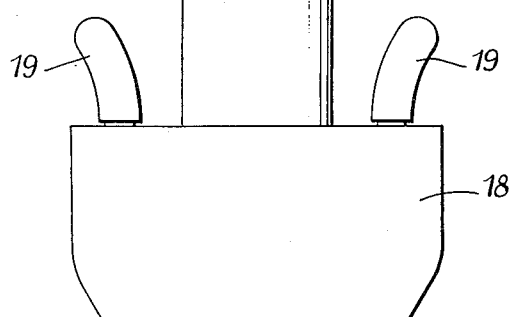
FIG.2 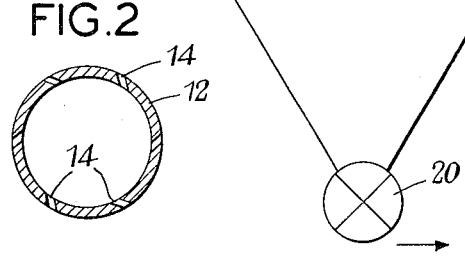 FIG.3 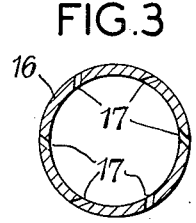
INVENTOR:
RONALD LESLIE COX

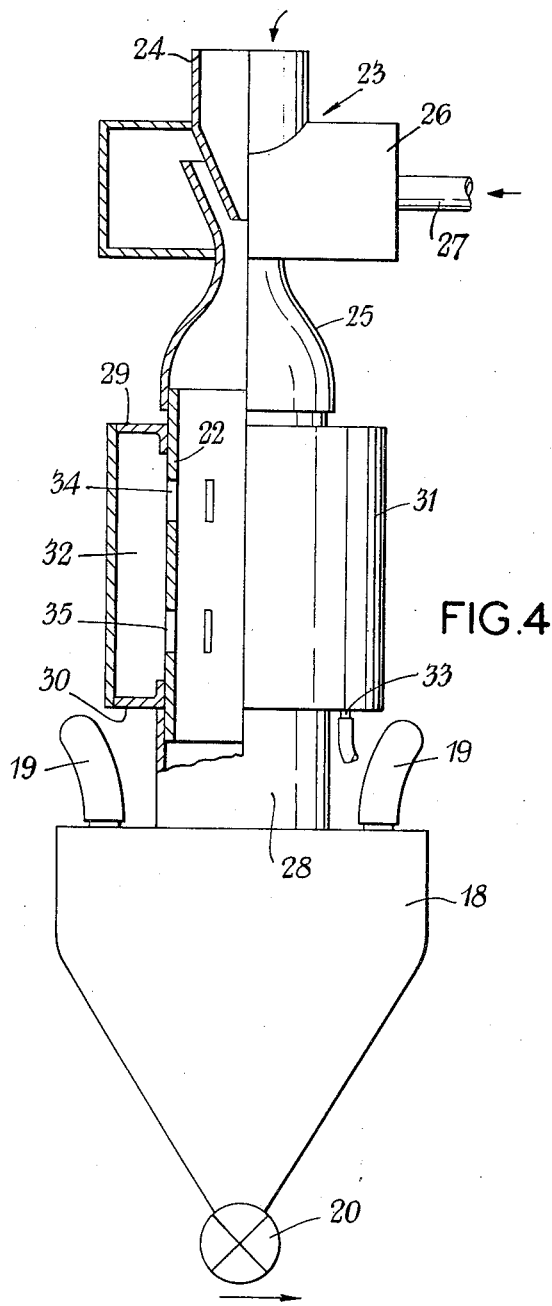

though sections of the slots 34 and 35 would be similar to the views shown in FIG-

United States Patent Office 3,047,275
Patented July 31, 1962

3,047,275
MIXING OF GRANULAR AND/OR POWDERY SOLID MATERIALS
Ronald Leslie Cox, 62 The Uplands, Loughton, England
Filed Apr. 27, 1960, Ser. No. 24,938
Claims priority, application Great Britain Apr. 29, 1959
9 Claims. (Cl. 259—4)

This invention relates to a method of and apparatus for mixing granular and/or powdery solid materials.

According to one aspect of the present invention there is provided a method of mixing granular and/or powdery solid materials, wherein the materials are passed in a substantially vertical direction through at least two mixing zones, into each of which a gas is injected in a plane transverse to the direction of passage of the materials, the gas being injected so as to rotate in alternate directions in adjacent mixing zones.

According to another aspect of the present invention there is provided an apparatus for mixing granular and/or powdery solid materials, wherein a substantially vertical tubular chamber is adapted to receive at its upper end the materials to be mixed, and wherein the chamber has in at least two locations spaced apart from one another means for directing a gas into the chamber in such a manner that the gas initially has a rotary movement within the chamber, the injection means being so arranged that when the apparatus is in operation, the gas will rotate in alternate directions at adjacent locations in the chamber.

In order to enable the invention to be more readily understood, reference will now be made to the accompanying drawings which illustrate diagrammatically and by way of example two embodiments thereof, and in which:

FIGURE 1 is a side view, partly in section, of apparatus for mixing powdery solid materials.

FIGURES 2 and 3 are cross-sections of part of the apparatus shown in FIGURE 1 taken along the lines II—II and III—III of FIGURE 1 respectively, and FIGURE 4 is a side view, partly in section, of a modification of the apparatus shown in FIGURE 1.

Referring now to FIGURES 1 to 3 of the drawings there is shown apparatus for mixing powdery solid materials comprising a vertical pipe 1 formed from three pipe sections 2, 3 and 4. The upper pipe section 2 is screwed into a cap 5 into which a venturi injector 6 for the materials to be mixed leads tangentially and at a small angle to the horizontal. A flange 7 is screwed onto the lower end of the upper pipe section 2, and a similar flange 8 is screwed onto the upper end of the middle pipe section 3. The flanges 7 and 8 are formed with recesses 9 and 10 between which are held short cylinders 11 and 12. The cylinder 12 forms, in effect, an extension of the pipe sections 2 and 3, and has six equally spaced holes 14 drilled therethrough as shown in FIGURE 2. The holes 14 have their axes tangential to a circle which has a diameter of about ⅔ of that of the cylinder 12, and which lies in a plane normal to the axis of the cylinder 12. The space between the flanges 7 and 8 and the cylinders 11 and 12 is connected to a course of compressed air (not shown) by means of a stub pipe 15 passing through the flange 8.

In a similar manner, the lower end of the middle pipe section 3 carries a flange 7 while the upper end of the lower pipe section 4 carries a flange 8, the flanges holding between them cylinders 11 and 16, the cylinder 16, in a similar manner to the cylinder 12, being formed with six equally spaced holes 17 having their axes tangential to a circle which has a diameter of about ⅔ of that of the pipe, and which lies in a plane normal to the axis of the pipe.

The holes 14 in the cylinder 12 are so formed that air injected through the holes into the pipe will rotate in a clockwise direction (when seen from above), whereas the holes 17 in the cylinder 16 are so formed that air injected into the pipe will rotate in an anti-clockwise direction.

The lower end of the pipe section 4 is connected to a hopper 18 of appreciably larger diameter than the pipe. Two outlets are provided in the top of the hopper, one on each side of the pipe, and each outlet is provided with a filter stocking 19. The hopper 18 narrows in a downward direction, and is closed by a rotary gate 20 through which the materials mixed in the apparatus can be removed.

In the operation of the apparatus just described, the materials to be mixed are fed from a hopper (not shown) into the venturi injector 6 which feeds them tangentially and in an anti-clockwise direction into the pipe 1. Compressed air is injected into the pipe through the two rings of holes 14 and 17, and is injected through the holes 14 so as to rotate in a clockwise direction and through the holes 17 so as to rotate in an anti-clockwise direction.

The injected materials to be mixed originally rotate in an anti-clockwise direction, and drop, partly due to gravity, and partly due to the downward movement of the air in the apparatus and enter a mixing zone formed by the air injected through the holes 14, the materials experiencing a gradual reversal of flow as they drop. The jets of air issuing from the holes 14 form a first mixing zone. The whirlpool effect of the jets of air causes intense agitation and thus mixing of the materials and causes them to rotate in a clockwise direction. As the materials drop further, the direction of rotation is gradually reversed and the materials are again subjected to intense agitation in a second mixing zone formed by the air introduced through the holes 17.

After leaving the second mixing zone, the materials fall into the hopper 18, where they settle, and excess air passes out through the outlets in the top of the hopper, the filter stockings 19 serving to retain fine materials which might otherwise be carried out of the hopper. The mixed materials are removed from the hopper through the rotary gate 20.

Referring now to FIGURE 4 of the drawings there is shown a modification of the apparatus described with reference to FIGURES 1 to 3. In this modification, a pipe 22 is threaded at both ends, and at its upper end is connected to a venturi injector 23 comprising a funnel shaped inlet pipe 24 arranged to discharge into a venturi-shaped pipe 25, the junction between the pipes 24 and 25 being surrounded by a chamber 26 to which compressed air can be supplied through a pipe 27.

At its lower end the pipe 22 is threaded onto a pipe 28 which is connected to the hopper 18 having outlets provided with filter stockings 19 and having a rotary gate 20.

Flanges 29 and 30 are screwed onto the outside of the pipe 22 and a cylinder 31 is welded to the outer edges of the flanges to form a chamber 32 surrounding the pipe 22, the flange 30 being provided with an inlet pipe 33 for connection to a source of compressed air (not shown). Two series each of six equally spaced slots 34 and 35 respectively are formed in the pipe 22, the ends of the slots 34 of one series being spaced from the ends of the slots 35 of the other series by a distance approximately equal to the mean diameter of the pipe. The slots have their axes tangential to a circle which has a diameter of about ⅔ of that of the pipe, and which lies in a plane normal to the axis of the pipe. (Cross-sections of the pipe 22 taken in the regions of the slots 34 and 35 would be similar to the views shown in FIGURES 2 and 3 respectively.)

In the operation of the apparatus just described with reference to FIGURE 4, the materials to be mixed are fed into the pipe 24 and injected into the venturi-shaped pipe 25 by compressed air from the chamber 26. The further operation of the apparatus is similar to that described with reference to FIGURES 1 to 3.

The apparatus herein described can be used for a discontinuous mixing operation, but one advantage of the apparatus is that the mixing operation can be continuous, materials to be mixed being fed into the apparatus by means of constant weight feeders, and the mixed materials being continuously removed from the hopper.

It will be appreciated that many modifications of the apparatus are possible, and various means of introducing the materials to be mixed into the mixing pipe may be employed. In particular, a rotary air lock may be employed when sticky or abrasive materials are to be mixed. Also, more than two series of jet rings may be formed, and the power input into the jet rings can be varied as desired. Furthermore, the rotary gate at the bottom of the hopper can be replaced by a bagging machine, or the lower end of the hopper can be closed by other means.

It is to be noted that the holes 14 and 17 or slots 34 and 35 need not be arranged in a horizontal plane, although this is preferred for convenience of manufacture, but may be arranged in a plane which lies at an angle to the axis of the mixing pipe and is transverse thereto. Furthermore the apparatus may be used for mixing materials which would oxidise in air, by employing an inert gas such as nitrogen.

Using the apparatus described with reference to FIGURES 1 to 3 in which the pipe was 3 inches in diameter, two mixtures were prepared, using in each case a total power of 60 cubic feet of air per minute at 100 p.s.i.g. and a mixture feed rate of 480 pounds per hour. The mixtures were by weight as follows:

(1) 90 parts powdered talc and 10 parts natural iron oxide, and (2) 90 parts natural iron oxide and 10 parts synthetic iron oxide.

In both cases an intimate mixture of the ingredients was obtained, and when the mixtures were spread out on a sheet of paper no streaks of one or the other colour were obtained. Furthermore the mixture feed rate could be increased to 1000 pounds per hour without affecting the efficiency of the mixing.

The apparatus has also been used to provide intimate mixtures which exhibit no streaks on spreading of 10% by weight of acetylene black and 90% by weight barytes, and mixtures of 10% thiocyanine blue and 90% china clay. In addition intimate mixtures of lemon chrome and whiting and lemon chrome and ultramarine blue have been obtained.

While it is possible to obtain some mixing of materials employing only one series of jet rings, it is found that the mixing is not satisfactory, but that when employing two series of jet rings excellent and intimate mixing is obtained, and the resulting mixture shows no streaks when spread, for example by means of a spatula or palette knife, on a sheet of paper.

It will be appreciated that many granular and/or powdery materials can be continuously or discontinuously mixed by the method and apparatus of the present invention, and it is even contemplated that large particles could be satisfactorily mixed with very fine particles, in which case, the fine particles will be present mainly as a coating on the large particles.

Having thus described the invention, what is claimed as new and desired to be secured by Letters Patent is:

1. A method of mixing granular and/or powdery solid materials, wherein the materials are passed in a substantially vertical direction through at least two mixing zones, into each of which a gas is injected in a plane transverse to the direction of passage of the materials, the gas being injected so as to rotate in alternate directions in adjacent mixing zones.

2. A method as claimed in claim 1, wherein the materials are initially given a rotary motion in a direction opposite to the direction of rotation of the gas in the first mixing zone.

3. A method as claimed in claim 1, wherein the mixing is performed continuously.

4. Apparatus for mixing granular and/or powdery solid materials, wherein a substantially vertical tubular chamber is adapted to receive at its upper end the materials to be mixed, and wherein the chamber has, in at least two locations spaced apart from one another, means for directing a gas into the chamber in such a manner that the gas initially has a rotary movement within the chamber, the said means being so arranged that when the apparatus is in operation, the gas will rotate in alternate directions at adjacent locations in the chamber.

5. Apparatus as claimed in claim 4, wherein the walls of the chamber are apertured, the apertures having their axes tangential to a circle which has a diameter of about ⅔ of that of the chamber.

6. Apparatus as claimed in claim 4, wherein the said means are arranged to direct the gas into the chamber in substantially horizontal planes.

7. Apparatus as claimed in claim 4, wherein means is provided for continuously feeding the materials to be mixed into the upper end of the chamber.

8. Apparatus as claimed in claim 4, wherein the lower end of the chamber is connected to a hopper for receiving the mixed materials.

9. Apparatus as claimed in claim 4, wherein a venturi injector is provided at the top of the chamber for injecting the materials to be mixed into the chamber.

References Cited in the file of this patent

UNITED STATES PATENTS

| | | |
|---|---|---|
| 1,000,689 | Paterson | Aug. 15, 1911 |
| 2,718,471 | Samler | Sept. 20, 1955 |

FOREIGN PATENTS

| | | |
|---|---|---|
| 105,776 | Australia | Nov. 9, 1938 |
| 585,553 | Great Britain | Feb. 11, 1947 |
| 419,519 | Italy | Mar. 26, 1947 |